No. 884,445. PATENTED APR. 14, 1908.
C. H. WILLIAMS, Jr.
TRUSSED BEAM.
APPLICATION FILED NOV. 15, 1907.
2 SHEETS—SHEET 1.
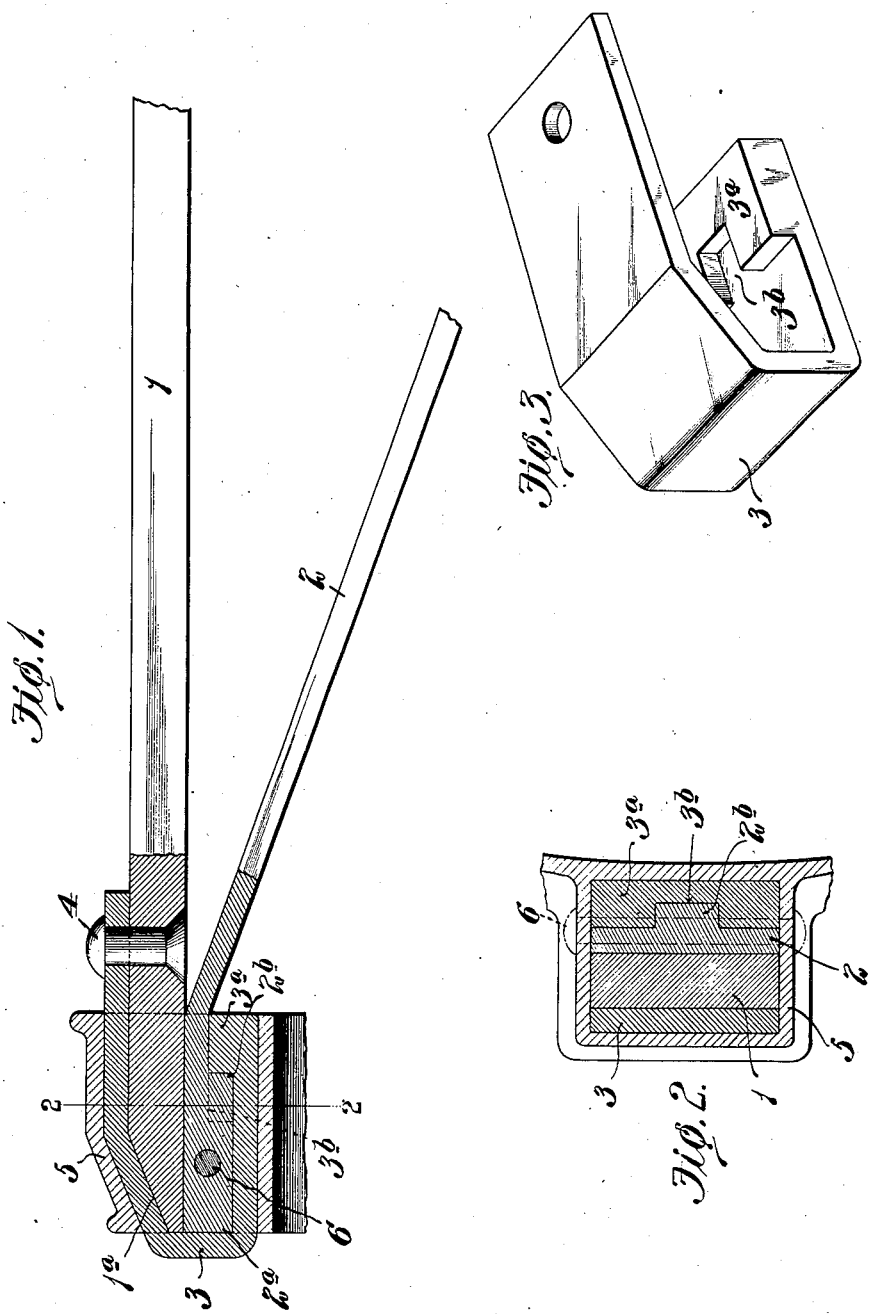
Witnesses:
Geo. R. Ladson
A. F. McCauley
Inventor,
Charles H. Williams, Jr.
By Bakewell Cornwall Attys.

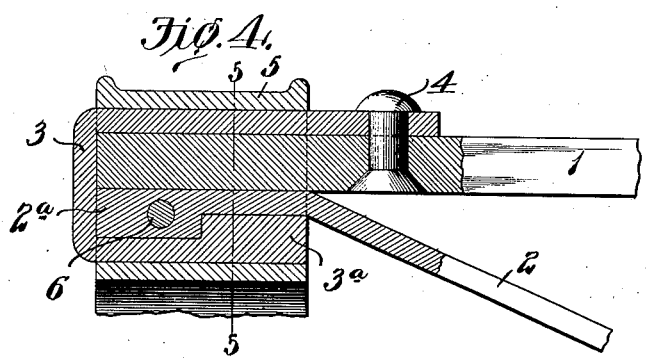
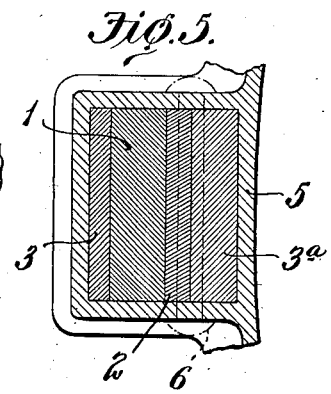
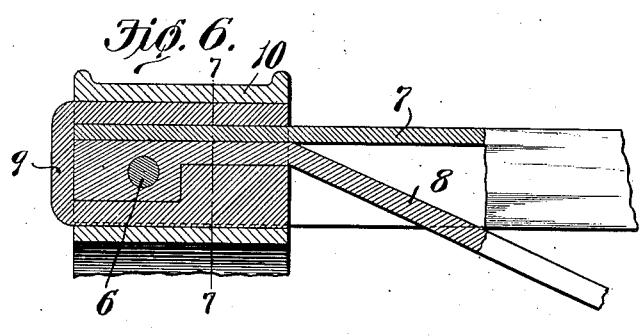
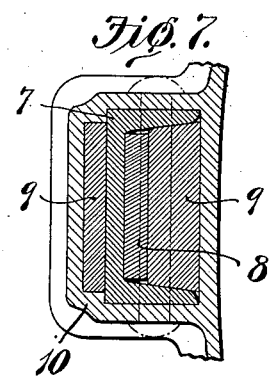
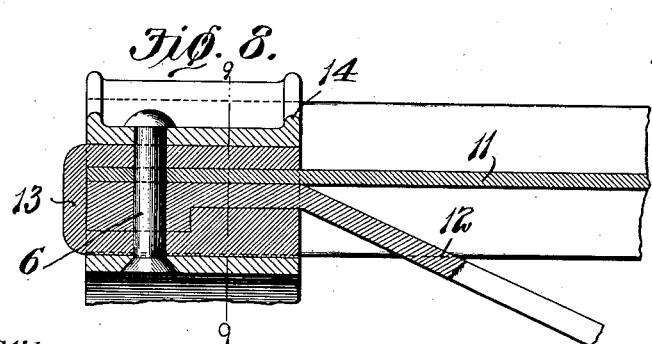
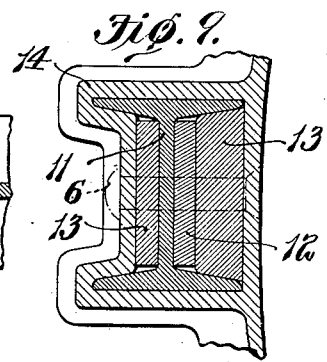

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

TRUSSED BEAM.

No. 884,445.      Specification of Letters Patent.      Patented April 14, 1908.

Application filed November 15, 1907. Serial No. 402,313.

*To all whom it may concern:*

Be it known that I, CHARLES H. WILLIAMS, Jr., a citizen of the United States, residing at Chicago, Cook county, Illinois, have invented a certain new and useful Improvement in Trussed Beams, of which the following is a full, clear, and exact description, such as will enable others skilled in the art to which it appertains to make and use the same, reference being had to the accompanying drawings, forming part of this specification, in which—

Figure 1 is a plan view, partly in section, of one end of my improved brake beam; Fig. 2 is a sectional view on the line 2—2 of Fig. 1; Fig. 3 is a detail view of the thrust block; Fig. 4 is a plan view, partly in section, of a modified form of beam; Fig. 5 is a cross sectional view on the line 5—5 of Fig. 4; Fig. 6 is a plan view, partly in section, of another modified form of beam; Fig. 7 is a sectional view on the line 7—7 of Fig. 6; Fig. 8 is a plan view, partly in section, of another modified form of beam; and Fig. 9 is a sectional view on the line 9—9 of Fig. 8.

This invention relates to a new and useful improvement in trussed beams, the object being to provide the end of the beam with a compression member in the form of a yoke which takes up the end thrust of the compression member and also the pull of the tension member.

Another object is to provide an interlock between the tension member and thrust yoke, so that when the parts are assembled they may be held in position by a single rivet, thus enabling the truss of the beam to be preserved and the brake head, if the trussed beam is used as a brake beam, to be renewed.

In the drawings, in Figs. 1, 2 and 3, 1 indicates the compression member in the form of a rectangular bar, and 2 is the tension member in the form of a flat plate. I have not shown the strut of the brake beam, but it is obvious that any wellknown strut may be employed in connection with my improved beam. The end of the compression member 1 is preferably beveled off as at 1ª, Fig. 1, while the end of the tension member 2 is provided with an enlargement 2ª formed by folding the tension member upon itself, upsetting the ends of the tension member, or welding a piece on the end of the tension member, as best suited to the tastes of the manufacturer. This enlargement is preferably formed on the front face of the tension member, and to form a secure interlock the enlargement is extended forwardly to form a tongue 2ᵇ.

3 indicates a yoke constituting the thrust member, which yoke is in the form of a strap and is provided on its forward edge with an enlargement 3ª either by folding the front leg of the yoke upon itself, upsetting the end of the front leg, or welding a piece thereto, as desired. This enlargement is provided with a recess 3ᵇ in which is received the tongue 2ᵇ of the tension member. In assembling the parts the tongue on the tension member is fitted in the recess in the forward leg of the yoke, and the end of the compression member 1 is slipped laterally in position, after which a securing device 4 is employed to rivet the rear leg of the yoke to the compression member. When the parts are thus assembled and secured together it is obvious that the brake head whose socket 5 is shown in Fig. 1, may be inserted in position or removed from position without destroying the integrity of the truss. When the brake head is in position I prefer to employ some securing means, as for instance the rivet 6, for holding the brake head in place. Of course, the yoke 3 hugs the beveled end of the compression member, and by so doing exerts a clamping action on the yoke tending to force the forward leg thereon into close contact with the enlarged end of the tension member.

In Figs. 4 and 5 I have illustrated a construction similar to that shown in Fig. 1, except that the end of the compression member is not beveled and the tension member is not provided with a tongue 2ᵇ.

In Fig. 6 I have shown the compression member in the form of a channel 7 in which the enlarged ends of the tension member 8 and the yoke 9 are received, said enlarged ends practically filling the space between the flanges and making a solid foundation for the socket of the brake head 10.

In Figs. 8 and 9 I have shown the compression member in the form of an I-beam 11, the tension member 12 and the yoke 13 being constructed substantially the same as in Fig. 6. Where an I-beam is used the socket of the brake head 14 must of course conform to the rear flanges on the I-beam, as shown in Fig. 9.

In Figs. 6 to 9 inclusive means, in the form of rivets, is shown for securing the brake heads in position. When this means is removed the brake heads can be removed, but the integrity of the truss will be preserved without any special securing means by reason of the fact that the flanges of the channel or I-beam, as the case may be, tend to hold the tension member and thrust yoke in position. In assembling the parts the enlarged end of the tension member is arranged in the channel of the compression member, after which the enlarged end of the thrust yoke is arranged in position and the rear leg of the thrust yoke is bent behind the leg of the compression member. When the brake head is arranged in position it will be seen that the back wall of the socket thereof holds the rear leg of the thrust yoke in position and prevents any movement thereof.

While I have illustrated in the accompanying drawings a brake head as the part coöperating with my improved truss beam, it is obvious that my invention is equally applicable to bolsters, that is, body bolsters and truck bolsters, and in the latter event the brake head will be replaced by an end casting forming the spring seat member of the bolster.

I am aware that minor changes in the construction, arrangement and combination of the several parts of my device can be made and substituted for those herein shown and described without in the least departing from the nature and principle of my invention.

Having thus described the invention, what is claimed as new and desired to be secured by Letters Patent is:

1. In a trussed beam, a compression member, a tension member arranged with its end against the compression member, and a thrust member embracing said compression and tension members and provided with a shoulder that coöperates with a shoulder on the tension member; substantially as described.

2. In a trussed beam, the combination with a compression member, a tension member whose end engages the end of the compression member, said tension member having an enlargement at its end, and a thrust yoke engaging the compression member and having an enlargement for coöperating with the enlargement of the tension member; substantially as described.

3. In a trussed beam, the combination of a compression member, a tension member having an interlocking enlargement provided with a tongue, and a yoke secured to the compression member and provided with an interlocking enlargement in which a recess is formed for coöperating with the interlocking enlargement and tongue of the tension member; substantially as described.

4. In a trussed beam, the combination of a compression member, a tension member having an enlarged end, a yoke having an enlarged end for coöperating with the enlarged end of the tension member, said yoke extending around the end of the compression member and along the rear face thereof; substantially as described.

5. In a trussed beam, the combination with a compression member, a tension member having an enlarged end, a yoke having an enlargement engaging the enlarged end of the tension member, and a socket in which said parts are arranged; substantially as described.

6. In a trussed beam, the combination of a flanged compression member, a tension member having an enlarged end, and a thrust yoke having an enlarged end coöperating with the enlarged end of the tension member, said enlarged ends fitting within the flanges of the compression member; substantially as described.

7. In a trussed beam, the combination of a compression member having its flanges extending forwardly, a flat plate tension member having an enlarged end, a thrust yoke having an enlarged end for coöperating with the enlarged end of the tension member, said thrust yoke extending around the end of the compression member and along the rear face of the web of said compression member, and a socketed part in which said before-mentioned elements are arranged; substantially as described.

8. A thrust member consisting of a bar of iron bent to form a yoke that is adapted to embrace the end portions of the compression and tension members of a trussed beam, said yoke having an enlargement which interlocks with the tension member; substantially as described.

9. A thrust member consisting of a bar of iron bent into the form of a yoke that is adapted to embrace the end portions of the compression and tension members of a trussed beam, one leg of said yoke being provided with a shoulder which coöperates with a shoulder on said tension member; substantially as described.

In testimony whereof I hereunto affix my signature in the presence of two witnesses, this 17th day of October 1907.

CHARLES H. WILLIAMS, Jr.

Witnesses:
E. T. WALKER,
E. B. LEIGH.